United States Patent
Ikarashi et al.

(10) Patent No.: US 6,187,724 B1
(45) Date of Patent: Feb. 13, 2001

(54) LUBRICANT COMPOSITION AND MAGNETIC RECORDING MEDIUM USING THE SAME

(75) Inventors: Tsunehiko Ikarashi, Saku; Koji Kobayashi, Nagano-ken; Hiromichi Kanazawa, Saku; Takahiro Hayashi, Komoro; Takehiko Iritani, Kawagoe, all of (JP)

(73) Assignees: Wako Pure Chemical Industries, Ltd., Osaka; TDK Corporation, Tokyo, both of (JP)

( * ) Notice: Under 35 U.S.C. 154(b), the term of this patent shall be extended for 0 days.

(21) Appl. No.: 09/161,385

(22) Filed: Sep. 28, 1998

(30) Foreign Application Priority Data

Sep. 29, 1997 (JP) ................................................ 9-282702

(51) Int. Cl.⁷ ..................... C10M 105/34; C10M 105/54
(52) U.S. Cl. .......................... 508/463; 508/465; 508/504; 508/509; 508/524; 560/184; 428/900
(58) Field of Search ..................................... 508/465, 463, 508/504, 509, 524, 588; 560/184; 428/902

(56) References Cited

U.S. PATENT DOCUMENTS 4,735,848   4/1988   Kondo et al.

FOREIGN PATENT DOCUMENTS

| 0 497 536 | 8/1992 | (EP) . |
| 0 563 791 | 10/1993 | (EP) . |
| 0 643 125 | 3/1995 | (EP) . |
| 0 737 508 | 10/1996 | (EP) . |
| 62-256218 | 11/1987 | (JP) . |
| 5-128498 | 5/1993 | (JP) . |
| 5-282662 | 10/1993 | (JP) . |
| 6-28717 | 4/1994 | (JP) . |

OTHER PUBLICATIONS

Derwent Abstracts, AN 95–220765, JP 07 133253, May 23, 1995.
Patent Abstracts of Japan, vol. 012, No. 263 (C–514), Jul. 22, 1988, JP 63 045238, Feb. 26, 1988.
Derwent Abstracts, AN 93–380406, JP 05 282662, Oct. 29, 1993.

*Primary Examiner*—Margaret Medley
*Assistant Examiner*—Cephia D. Toomer
(74) *Attorney, Agent, or Firm*—Oblon, Spivak, McClelland, Maier & Neustadt, P.C.

(57) ABSTRACT

A lubricant composition comprising (A) a compound of the formula:

$$R^1-COO-R^2$$

wherein $R^1$ is a higher aliphatic hydrocarbon residue and $R^2$ is an aliphatic hydrocarbon residue which may contain fluorine atom(s) and/or oxygen atom(s), and (B) a compound of the formula:

$$R^3-\underset{\underset{CH_2-COO-R_5}{|}}{CH}-COO-R^4$$

wherein $R^3$ is a higher aliphatic hydrocarbon residue; $R^4$ and $R^5$ are independently a hydrogen atom or an aliphatic hydrocarbon residue which may contain fluorine atom(s) and/or oxygen atom(s), gives a lubricant layer in a magnetic recording medium having good running durability, still life and weather resistance.

20 Claims, No Drawings

LUBRICANT COMPOSITION AND MAGNETIC RECORDING MEDIUM USING THE SAME

BACKGROUND OF THE INVENTION

This invention relates to a lubricant composition useful for producing a magnetic recording medium, etc., and a magnetic recording medium obtained by use of said lubricant composition.

In the field of magnetic recording, improvements, such as digitization, miniaturization, long-time running, etc. are in progress, so that there is a growing demand for enhancement of the density of recording media. In particular, thin metal film type recording media having a magnetic recording layer composed of a thin ferromagnetic metal layer have been vigorously investigated in recent years because they are very advantageous for recording at a short wavelength.

In such circumstances, lubricants for magnetic recording medium are also noted and it has turned out that the performance characteristics of a magnetic recording medium itself can be improved by improving the lubricant.

For example, carboxylic acid esters have been known as the lubricants for magnetic recording medium. However, they involve, for example, the following problem: particularly when they are stored at high temperature and humidity, water repellency of the lubricant layer is reduced, and thus water tends to penetrate into the lubricant layer, as a result of which adhesion of the lubricant is weakened and the lubricant itself is coagulated, and hence the original characteristics of the lubricant cannot be maintained any longer.

Fluorocarboxylic acids and esters derived there-from involves, for example, the following problems: the fluorocarboxylic acids damage the surface of a magnetic recording layer or the surface of a protecting layer constituting the magnetic recording medium because they are strong acids; the derived esters are easily hydrolyzable and are not sufficient in weather resistance; synthesis of useful fluorocarboxylic acids having a large number of carbon atoms is difficult; and fluorocarboxylic acids having a relatively small number of carbon atoms and esters derived therefrom are not sufficient in friction-reducing effect, namely, they impart only insufficient running durability.

Ester type lubricants obtained from a mono-carboxylic acid and a perfluoroalkyl alcohol (JP-A 62-256218) have a relatively small cross sectional area of the molecule because of a polar group, a carbonyl group, in its molecule. Therefore, they are advantageous in that they can easily cover the surface of a magnetic layer or the surface of a protective layer constituting a magnetic recording medium. They, however, are disadvantageous in that sufficient exhibition of their lubricating effect is difficult because the alkyl group in the molecule is oriented in such a way as being inclined to the surface of the magnetic layer or protective layer.

Ester type lubricants obtained from a dicarboxylic acid and a fluoroalkyl alcohol (JP-A 5-128498, JP-A 5-282662 and JP-B 6-28717) are advantageous in that since molecules of the lubricant are adsorbed and oriented on the surface by two polar groups per molecule, the alkyl group in the molecule is hardly oriented in such a way as being inclined to the surface, so that the lubricant easily exhibits its lubricating effect. On the other hand, the lubricants are disadvantageous in that the cross sectional area of the lubricant molecule becomes relatively large because of the two polar groups and hence it becomes difficult to cover the surface by the lubricant molecule. In addition, when cooled to room temperature after storage at high temperature and humidity, the lubricants are recrystallized in some cases because of their strong tendency to molecular orientation, which causes deterioration of the weather resistance of the magnetic recording medium. Moreover, the lubricants are disadvantageous also in that the molecular weight of the lubricants is rather high due to their structure, and thus in magnetic recording mediums using these lubricants, still characteristics are lowered at a low temperature range.

BRIEF SUMMARY OF THE INVENTION

The present invention has been accomplished under such circumstances as above, and an object of the present invention is to provide a lubricant composition capable of producing a magnetic recording medium free from the above-mentioned defects and excellent in running durability, still life and weather resistance, and also to provide a magnetic recording medium using said lubricant composition.

The present invention provides a lubricant composition comprising (A) a compound of the formula:

 [1]

wherein $R^1$ is a higher aliphatic hydrocarbon residue which may have one or more fluorine atoms; and $R^2$ is an aliphatic hydrocarbon residue which may have one or more fluorine atoms or oxygen atoms or both, and (B) a compound of the formula:

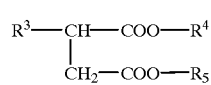 [2]

wherein $R^3$ is a higher aliphatic hydrocarbon residue which may have one or more fluorine atoms; and $R^4$ and $R^5$ are independently a hydrogen atom or an aliphatic hydrocarbon residue which may have one or more fluorine atoms or oxygen atoms or both, provided that at least one of $R^4$ and $R^5$ is an aliphatic fluorohydrocarbon residue which may have one or more oxygen atoms.

The present invention also provides a magnetic recording medium using said lubricant composition as a lubricant layer therein.

DETAILED DESCRIPTION OF THE INVENTION

The lubricant composition of the present invention comprises a compound of the formula:

 [1]

wherein $R^1$ is a higher aliphatic hydrocarbon residue which may have one or more fluorine atoms; and $R^2$ is an aliphatic hydrocarbon residue which may have one or more fluorine atoms or oxygen atoms or both, and a compound of the formula:

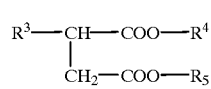 [2]

wherein $R^3$ is a higher aliphatic hydrocarbon residue which may have one or more fluorine atoms; and $R^4$ and $R^5$ are independently a hydrogen atom or an aliphatic hydrocarbon residue which may have one or more fluorine atoms or oxygen atoms or both, provided that at least one of $R^4$ and $R^5$ is an aliphatic fluorohydrocarbon residue which may have one or more oxygen atoms.

The present inventors have earnestly investigated lubricants capable of producing a high-performance magnetic recording medium to reach such finding that the above-mentioned problems in the conventional lubricants can be solved by using a lubricant composition comprising a compound of the formula [1] and a compound of the formula [2], and on the basis of this finding the present invention has been accomplished.

In the formula [1], the higher aliphatic hydrocarbon residue represented by $R^1$, i.e., the higher aliphatic hydrocarbon residue which may have one or more fluorine atoms may be either straight-chain or branched, among which the straight-chain is preferable. As the higher aliphatic hydrocarbon residue, there can be exemplified ones having generally 6 to 24 carbon atoms, preferably 8 to 24 carbon atoms, more preferably 11 to 24 carbon atoms. The aliphatic hydrocarbon residue may have 1 to 4 double bonds, preferably one or two double bonds therein. Specific examples of the higher aliphatic hydrocarbon residue are an alkyl group such as an n-hexyl group, an isohexyl group, a heptyl group, an octyl group, a nonyl group, a decyl group, an undecyl group, a dodecyl group, a tetradecyl group, a hexadecyl group, an octadecyl group, an icosyl group, a docosyl group, or a tetracosyl group; an aliphatic hydrocarbon residue having 1 to 4 double bonds (i.e. an alkenyl group, an alkadienyl group, an alkatrienyl group or an alkatetraenyl group) such as an oleyl group, or a linoleyl group. As the higher aliphatic fluorohydrocarbon residue containing one or more fluorine atoms, there can be exemplified those obtained by replacing generally 1 to 41, preferably 2 to 18 of the hydrogen atoms of the above-exemplified higher aliphatic hydrocarbon residue by fluorine atoms. In the present specification, each aliphatic fluorohydrocarbon residue exemplified hereinafter is one which has one to a predetermined number of F atoms. But, $R^1$ does not include a perfluorohydrocarbon group. Specific examples of the higher aliphatic hydrocarbon residue containing one or more fluorine atoms are an aliphatic fluoroalkyl group such as a fluorohexyl group, a fluoroheptyl group, a fluorooctyl group, a fluorononyl group, a fluorodecyl group, a fluoroundecyl group, a fluorododecyl group, a fluorotetradecyl group, a fluorohexadecyl group, a fluorooctadecyl group, a fluoroicosyl group, a fluorodocosyl group, a fluorotetracosyl group, or a fluorohexacosyl group; an aliphatic fluorohydrocarbon residue having 1 to 4 double bonds (i.e. a fluoroalkenyl group, a fluoroalkadienyl group, a fluoroalkatrienyl group or a fluoroalkatetraenyl group) such as a fluorooleyl group or a fluorolinoleyl group.

Among them, $R^1$ is preferably a higher aliphatic hydrocarbon residue containing no fluorine atom, considering lubricating properties.

As the aliphatic hydrocarbon residue represented by $R^2$, i.e., the aliphatic hydrocarbon residue which may have one or more fluorine atoms or oxygen atoms or both, there can be exemplified aliphatic hydrocarbon residues having generally 1 to 26 carbon atoms, preferably 4 to 20 carbon atoms, more preferably 4 to 14 carbon atoms. The aliphatic hydrocarbon residue is preferably straight-chained. The aliphatic hydrocarbon residue may have 1 to 4 double bonds, preferably one or two double bonds therein. Specific examples of aliphatic hydrocarbon residue are an alkyl group such as a methyl group, an ethyl group, a propyl group, a butyl group, a pentyl group, a hexyl group, a heptyl group, an octyl group, a nonyl group, a decyl group, an undecyl group, a dodecyl group, a tetradecyl group, a hexadecyl group, an octadecyl group, an icosyl group, a docosyl group, a tetracosyl group, or a hexacosyl group; an aliphatic hydrocarbon residue having 1 to 4 double bonds (i.e. an alkenyl group, an alkadienyl group, an alkatrienyl group or an alkatetraenyl group) such as an oleyl group, or a linoleyl group.

As the aliphatic hydrocarbon residue containing one or more fluorine atoms, there can be exemplified aliphatic fluorohydrocarbon residues obtained by replacing generally 1 to 53, preferably 2 to 41 of the hydrogen atoms of the above-exemplified hydrocarbon residue by fluorine atoms. Specific examples of the aliphatic hydrocarbon residue containing one or more fluorine atoms are a fluoroalkyl group such as a fluoromethyl group, a fluoroethyl group, a fluoropropyl group, a fluorobutyl group, a fluoropentyl group, a fluorohexyl group, a fluoroheptyl group, a fluorooctyl group, a fluorononyl group, a fluorodecyl group, a fluoroundecyl group, a fluorododecyl group, a fluorotetradecyl group, a fluorohexadecyl group, a fluorooctadecyl group, a fluoroicosyl group, a fluorodocosyl group, a fluorotetracosyl group, a fluorohexacosyl group, a trifluoromethyl group, a perfluoroethyl group, a perfluoropropyl group, a perfluorobutyl group, a perfluoropentyl group, a perfluorohexyl group, a perfluoroheptyl group, a perfluorooctyl group, a perfluorononyl group, a perfluorodecyl group, a perfluoroundecyl group, a perfluorododecyl group, a perfluorotetradecyl group, a perfluorohexadecyl group, a perfluorooctadecyl group, a perfluoroicosyl group, a perfluorodocosyl group, a perfluorotetracosyl group, or a perfluorohexacosyl group; an aliphatic fluorohydrocarbon residue having 1 to 4 double bonds (i.e. a fluoroalkenyl group, a fluoroalkadienyl group, a fluoroalkatrienyl group or a fluoroalkatetraenyl group) such as a fluorooleyl group, a fluorolinoleyl group, a perfluorooleyl group, or a perfluorolinoleyl group.

As the aliphatic hydrocarbon residue containing one or more oxygen atoms, there can be exemplified aliphatic hydrocarbon residues containing 1 to 4 —O— groups, preferably one or two —O— groups, at arbitrary positions in the chain of the hydrocarbon residue. Specific examples of the aliphatic hydrocarbon residue containing one or more oxygen atoms are —$CH_2$—O—$CH_3$, —$CH_2CH_2$—O—$CH_3$, —$CH_2CH_2$—O—$CH_2CH_3$, —$CH_2CH_2$—O—$CH_2CH_2$—O—$CH_3$, —$CH_2CH_2$—O—$CH_2CH_2$—O—$C_8H_{17}$, —$CH_2CH_2$—O—$CH_2CH_2$—O—$C_9H_{17}$, —$CH_2CH_2$—O—$CH_2CH_2$—O—$C_9H_{17}$, —$(CH_2)_5$—O—$(CH_2)_7$—O—$(CH_2)_3CH_3$, etc.

As the aliphatic hydrocarbon residue containing one or more fluorine atoms and one or more oxygen atoms, there can be exemplified those obtained by replacing 1 to 53, preferably 1 to 41, more preferably 1 to 19 of the hydrogen atoms of the above-exemplified hydrocarbon residue containing one or more oxygen atoms by fluorine atoms. Specific examples of the alkyl group containing one or more fluorine atoms and one or more oxygen atoms are —$CH_2$—O—$CH_2F$, —$CH_2CHF$—O—$CH_2F$, —$CH_2CF_2$—O—$CF_2CH_3$, —$CF_2CF_2$—O—$CH_2CH_2$—O—$CH_3$, —$(CH_2)_5$—O—$(CH_2)_7$—O—$(CF_2)_3CH_3$, —$(CH_2)_5$—O—$(CH_2)_7$—O—$C_3F_7$, —$CH_2CH_2$—O—$CH_2CH_2$—O—$C_8F_{17}$, —$CH_2CH_2$—O—$CH_2CH_2$—O—$C_9F_{17}$, etc.

Preferable examples of the aliphatic hydrocarbon residue which may have one or more fluorine atoms or oxygen atoms or both and is represented by $R^2$ are groups of the formula [3]:

$$—R^6—Y \qquad [3]$$

wherein $R^6$ is a methylene chain which may contain one or more oxygen atoms; and Y is a fluoroalkyl group.

In the formula [3], as the methylene chain represented by $R^6$, i.e., the methylene chain which may contain one or more oxygen atoms, there can be exemplified methylene chains having generally one or more carbon atoms, preferably 1 to 6 carbon atoms. Specific examples of the methylene chain are methylene, ethylene, trimethylene, tetramethylene, pentamethylene, hexamethylene, etc. Although the methylene chain preferably contains no oxygen atom, it may contain one or more oxygen atoms. As the methylene chain containing one or more oxygen atoms, there can be exemplified methylene chains having 1 to 4 —O— groups, preferably one or two —O— groups, at arbitrary positions in the methylene chain. Specific examples of the methylene chain containing one or more oxygen atoms are —CH$_2$—O—, —CH$_2$CH$_2$—O—CH$_2$—, —CH$_2$CH$_2$—O—CH$_2$CH$_2$—, —CH$_2$CH$_2$—O—CH$_2$CH$_2$—O—, —CH$_2$CH$_2$—O—CH$_2$CH$_2$—O—CH$_2$CH$_2$—, —CH$_2$CH$_2$—O—CH$_2$CH$_2$CH$_2$—O—CH$_2$—, —CH$_2$CH$_2$CH$_2$—O—CH$_2$—O—CH$_2$—O—CH$_2$CH$_2$—, etc.

As the fluoroalkyl group represented by Y, there can be exemplified fluoroalkyl groups of generally 1 to 20, preferably 2 to 9 carbon atoms obtained by replacing 1 to 41, preferably 2 to 19 of the hydrogen atoms of an alkyl group, more preferably perfluoroalkyl groups obtained by replacing all the hydrogen atoms of an alkyl group by fluorine atoms. Specific examples of the fluoroalkyl group are a fluoromethyl group, a fluoroethyl group, a fluoropropyl group, a fluorobutyl group, a fluoropentyl group, a fluorohexyl group, a fluoroheptyl group, a fluorooctyl group, a fluorononyl group, a fluorodecyl group, a fluoroundecyl group, a fluorododecyl group, a fluorotetradecyl group, a fluorohexadecyl group, a fluorooctadecyl group, a fluoroicosyl group, a fluorodocosyl group, a fluorotetracosyl group, a fluorohexacosyl group, a trifluoromethyl group, a perfluoroethyl group, a perfluoropropyl group, a perfluorobutyl, group, a perfluoropentyl group, a perfluorohexyl group, a perfluoroheptyl group, a perfluorooctyl group, a perfluorononyl group, a perfluorodecyl group, a perfluoroundecyl group, a perfluorododecyl group, a perfluorotetradecyl group, a perfluorohexadecyl group, a perfluorooctadecyl group, a perfluoroicosyl group, a perfluorodocosyl group, a perfluorotetracosyl group, a perfluorohexacosyl group, etc.

Typical examples of the compound of the formula [1] are higher fatty acid esters such as $C_{13}H_{27}COOC_4H_9$, $C_{15}H_{31}COOC_4H_9$, $C_{17}H_{35}COOC_4H_9$, and $C_{17}H_{33}COOC_4H_9$; and fluorine-containing higher fatty acid esters such as $C_{13}H_{27}COOCH_2CH_2C_8F_{17}$, $C_{15}H_{31}COOCH_2CH_2C_8F_{17}$, $C_{17}H_{35}COOCH_2CH_2C_8F_{17}$, $C_{17}H_{33}COOCH_2CH_2C_8F_{17}$, $C_{13}H_{27}COOCH_2CH_2OCH_2CH_2OC_9F_{17}$, $C_{15}H_{31}COOC_4F_9$, and $C_{17}H_{31}COOCH_2CH_2C_8F_{17}$.

In the formula [2], the higher aliphatic hydrocarbon residue represented by $R^3$, i.e., the higher aliphatic hydrocarbon residue which may have one or more fluorine atoms may be either straight-chain or branched and includes hydrocarbon residues having generally 6 to 24 carbon atoms, preferably 8 to 24 carbon atoms, more preferably 11 to 24 carbon atoms.

The higher aliphatic hydrocarbon residue represented by $R^3$ may have 1 to 4 double bonds therein, preferably one or two double bonds therein. Specific examples of the higher aliphatic hydrocarbon residue are an alkyl group such as an n-hexyl group, an isohexyl group, a heptyl group, an octyl group, a nonyl group, a decyl group, an undecyl group, a dodecyl group, a tetradecyl group, a hexadecyl group, an octadecyl group, an icosyl group, a docosyl group, or a tetracosyl group; an aliphatic hydrocarbon residue having 1 to 4 double bonds (i.e. an alkenyl group, an alkadienyl group, an alkatrienyl group or an alkatetraenyl group) such as an oleyl group, or a linoleyl group.

As the higher aliphatic hydrocarbon residue containing one or more fluorine atoms, there can be exemplified those obtained by replacing 1 to 49, preferably 2 to 24 of the hydrogen atoms of the above-exemplified hydrocarbon residue by fluorine atoms. Specific examples of the higher aliphatic hydrocarbon residue containing one or more fluorine atoms are a fluoroalkyl group such as a fluorohexyl group, a fluoroheptyl group, a fluorooctyl group, a fluorononyl group, a fluorodecyl group, a fluoroundecyl group, a fluorododecyl group, a fluorotetradecyl group, a fluorohexadecyl group, a fluorooctadecyl group, a fluoroicosyl group, a fluorodocosyl group, a fluorotetracosyl group, or a fluorohexacosyl group; an aliphatic fluorohydrocarbon residue having 1 to 4 double bonds (i.e. a fluoroalkenyl group, a fluoroalkadienyl group, a fluoroalkatrienyl group, or a fluoroalkatetraenyl group) such as a fluorooleyl group, or a fluorolinoleyl group.

Among them, $R^3$ is preferably a higher aliphatic hydrocarbon residue containing no fluorine atom.

As the aliphatic hydrocarbon residue represented by each of $R^4$ and $R^5$, i.e., the aliphatic hydrocarbon residue which may have one or more fluorine atoms or oxygen atoms or both, there can be exemplified aliphatic hydrocarbon residues having generally 1 to 26 carbon atoms, preferably 4 to 20 carbon atoms, more preferably 4 to 14 carbon atoms. The aliphatic hydrocarbon residue is preferably straight-chain. The aliphatic hydrocarbon residue may have 1 to 4 double bonds, preferably one or two double bonds therein. Specific examples of the hydrocarbon residue are an alkyl group such as a methyl group, an ethyl group, a propyl group, a butyl group, a pentyl group, a hexyl group, a heptyl group, an octyl group, a nonyl group, a decyl group, an undecyl group, a dodecyl group, a tetradecyl group, a hexadecyl group, an octadecyl group, an icosyl group, a docosyl group, a tetracosyl group, or a hexacosyl group; an aliphatic hydrocarbon residue having 1 to 4 double bonds (i.e. an alkenyl group, an alkadienyl group, an alkatrienyl group or an alkatetraenyl group) such as an oleyl group, or a linoleyl group.

As the aliphatic hydrocarbon residue containing one or more fluorine atoms, there can be exemplified aliphatic fluorohydrocarbon residues obtained by replacing generally 1 to 53, preferably 2 to 24 of the hydrogen atoms of the above-exemplified hydrocarbon residue by fluorine atoms. Specific examples of the aliphatic hydrocarbon residue containing one or more fluorine atoms are an aliphatic fluoroalkyl group such as a fluoromethyl group, a fluoroethyl group, a fluoropropyl group, a fluorobutyl group, a fluoropentyl group, a fluorohexyl group, a fluoroheptyl group, a fluorooctyl group, a fluorononyl group, a fluorodecyl group, a fluoroundecyl group, a fluorododecyl group, a fluorotetradecyl group, a fluorohexadecyl group, a fluorooctadecyl group, a fluoroicosyl group, a fluorodocosyl group, a fluorotetracosyl group, a fluorohexacosyl group, a trifluoromethyl group, a perfluoroethyl group, a perfluoropropyl group, a perfluorobutyl group, a perfluoropentyl group, a perfluorohexyl group, a perfluoroheptyl group, a perfluorooctyl group, a perfluorononyl group, a perfluorodecyl group, a perfluoroundecyl group, a perfluorododecyl group, a perfluorotetradecyl group, a perfluorohexadecyl group, a perfluorooctadecyl group, a perfluoroicosyl group, a perfluorodocosyl group, a perfluorotetracosyl group, or a perfluorohexacosyl group; an aliphatic fluorohydrocarbon residue having 1 to 4 double bonds (i.e. a fluoroalkenyl group, a fluoroalkadienyl group, a fluoroalkatrienyl group, or a fluoroalkatetraenyl group) such as a fluorooleyl group, a fluorolinoleyl group, a perfluorooleyl group, or a perfluorolinoleyl group.

As the aliphatic hydrocarbon residue containing one or more oxygen atoms, there can be exemplified aliphatic hydrocarbon residues containing 1 to 4 —O— groups, preferably one or two —O— groups at arbitrary positions in the chain of the aliphatic hydrocarbon residue. Specific examples of the aliphatic hydrocarbon residue containing one or more oxygen atoms are —CH$_2$—O—CH$_3$, —CH$_2$CH$_2$—O—CH$_3$, —CH$_2$CH$_2$—O—CH$_2$CH$_3$, —CH$_2$CH$_2$—O—CH$_2$CH$_2$—O—CH$_3$, —CH$_2$CH$_2$—O—CH$_2$CH$_2$—O—C$_9$H$_{17}$, —(CH$_2$)$_5$—O—(CH$_2$)$_7$—O—(CH$_2$)$_3$CH$_3$, etc.

As the aliphatic hydrocarbon residue containing one or more fluorine atoms and one or more oxygen atoms, there can be exemplified those obtained by replacing 1 to 33, preferably 2 to 9 of the hydrogen atoms of the above-exemplified hydrocarbon residue containing one or more oxygen atoms by fluorine atoms. Specific examples of the aliphatic hydrocarbon residue containing one or more fluorine atoms and one or more oxygen atoms are —CH$_2$—O—CH$_2$F, —CH$_2$CHF—O—CH$_2$F, —CH$_2$CF$_2$—O—CF$_2$CH$_3$, —CF$_2$CF$_2$—O—CH$_2$CH$_2$—O—CH$_3$, —(CH$_2$)$_5$—O—(CH$_2$)$_7$—O—(CF$_2$)$_3$CH$_3$, —(CH$_2$)$_5$—O—(CH$_2$)$_7$—O—C$_3$F$_7$, —CH$_2$CH$_2$—O—CH$_2$CH$_2$—O—C$_9$F$_{17}$, etc.

Preferable examples of the aliphatic hydrocarbon residue which may have one or more fluorine atoms or oxygen atoms or both and is represented by each of R$^4$ and R$^5$ are groups represented by the formula [3]:

$$—R^6—Y \qquad [3]$$

wherein R$^6$ and Y are as defined above.

Typical examples of the compound of the formula [2] are the following compounds:

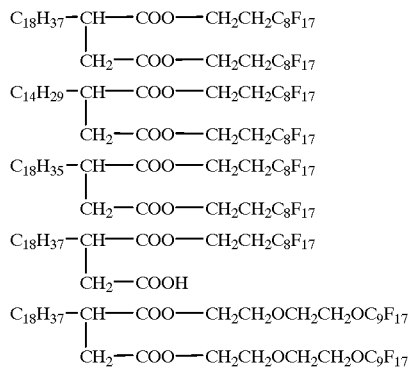

Among the compounds of the formulae [1] and [2] in the lubricant composition, preferable ones are in the formula [1], R$^1$ is an alkyl group having 6 to 24 carbon atoms, an aliphatic hydrocarbon residue having 6 to 24 carbon atoms and 1 to 4 double bonds therein, a fluoroalkyl group having 6 to 24 carbon atoms and 1 to 41 fluorine atoms, or an aliphatic fluorohydrocarbon residue having 6 to 24 carbon atoms and 1 to 41 fluorine atoms with 1 to 4 double bonds therein; R$^2$ is an alkyl group having 1 to 26 carbon atoms, an aliphatic hydrocarbon residue having 1 to 26 carbon atoms and 1 to 4 double bonds therein, an alkyl group having 1 to 26 carbon atoms with 1 to 4 oxygen atoms in the main chain, an aliphatic hydrocarbon residue having 1 to 26 carbon atoms and 1 to 4 double bonds therein with 1 to 4 oxygen atoms in the main chain, a fluoroalkyl group having 1 to 26 carbon atoms and 1 to 53 fluorine atoms, an aliphatic fluorohydrocarbon residue having 1 to 26 carbon atoms and 1 to 53 fluorine atoms and 1 to 4 double bonds therein, a fluoroalkyl group having 1 to 26 carbon atoms and 1 to 53 fluorine atoms with 1 to 4 oxygen atoms in the main chain, or an aliphatic fluorohydrocarbon residue having 1 to 26 carbon atoms, 1 to 53 fluorine atoms and 1 to 4 double bonds therein with 1 to 4 oxygen atoms in the main chain, and in the formula [2], R$^3$ is an alkyl group having 6 to 24 carbon atoms, an aliphatic hydrocarbon residue having 6 to 24 carbon atoms and 1 to 4 double bonds therein, a fluoroalkyl group having 6 to 24 carbon atoms and 1 to 49 fluorine atoms, or an aliphatic fluorohydrocarbon residue having 6 to 24 carbon atoms and 1 to 49 fluorine atoms with 1 to 4 double bonds therein; R$^4$ and R$^5$ are independently an alkyl group having 1 to 26 carbon atoms, an aliphatic hydrocarbon residue having 1 to 26 carbon atoms and 1 to 4 double bonds therein, an alkyl group having 1 to 26 carbon atoms with 1 to 4 oxygen atoms in the main chain, an aliphatic hydrocarbon residue having 1 to 26 carbon atoms and 1 to 4 double bonds therein with 1 to 4 oxygen atoms in the main chain, a fluoroalkyl group having 1 to 26 carbon atoms and 1 to 53 fluorine atoms, an aliphatic fluorohydrocarbon residue having 1 to 26 carbon atoms, 1 to 53 fluorine atoms and 1 to 4 double bonds therein, a fluoroalkyl group having 1 to 26 carbon atoms and 1 to 53 fluorine atoms with 1 to 4 oxygen atoms in the main chain, or an aliphatic fluorohydrocarbon residue having 1 to 26 carbon atoms, 1 to 53 fluorine atoms and 1 to 4 double bonds therein with 1 to 4 oxygen atoms in the main chain.

Of compounds of the formula [1], compounds of the following formula [5] are novel:

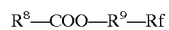

$$R^8—COO—R^9—Rf \qquad [5]$$

wherein R$^8$ is an alkyl group having 13 carbon atoms; R$^9$ is a methylene chain having 2 to 6 carbon atoms; and Rf is a perfluoroalkyl group having 7 to 20 carbon atoms.

In the formula [5], as the alkyl group of 13 carbon atoms represented by R$^8$, there can be exemplified straight-chain or branched alkyl groups, preferably straight-chain alkyl groups. Specific examples of the alkyl group are an n-tridecyl group, a 1-methyldodecyl group, a 2-methyldodecyl group, a 5-methyldodecyl group, a 12-methyldodecyl group, a 1-ethylundecyl group, a 4-ethylundecyl group, an 8-ethylundecyl group, a 11-ethylundecyl group, etc.

The perfluoroalkyl group of 7 to 20 carbon atoms represented by Rf is preferably straight-chain. Specific examples of the perfluoroalkyl group are a perfluoroheptyl group, a perfluorooctyl group, a perfluorononyl group, a perfluorodecyl group, a perfluoroundecyl group, a perfluorododecyl group, a perfluorotetradecyl group, a perfluorohexadecyl group, a perfluorooctadecyl group, a perfluoroicosyl group, etc.

The compound of the formula [1] which is used as an ingredient of the lubricant composition of the present invention can be obtained, for example, by esterifying a compound of the formula R$^1$COOH or a compound of the formula:

$$R^1COX \qquad [6]$$

wherein R$^1$ is as defined above; and X is a halogen atom, with a compound of the formula R$^2$OH by a dehydrating or dehydrohalogenating condensation using a condensing agent.

The amount of the compound of the formula $R^2OH$ used is generally 1 to 3 equivalents, preferably 1.1 to 1.5 equivalents, per equivalent of the compound of the formula $R^1COOH$ or the compound of the formula $R^1COX$.

In the formula [6], the halogen atom represented by X includes, for example, a chlorine atom, a bromine atom, an iodine atom, a fluorine atom, etc.

As the condensing agent, any conventional ones may be used. There can be exemplified inorganic dehydrating agents (e.g. concentrated sulfuric acid, diphosphorus pentaoxide, anhydrous zinc chloride, etc.), carbodiimides (e.g. N,N'-dicyclohexylcarbodiimide, 1-ethyl-3-(3-dimethylaminopropylcarbodiimide)hydrochloride, etc.), polyphosphoric acid, acetic anhydride, carbonyldiimidazole, p-toluenesulfonyl chloride, etc.

Although the amount of the condensing agent used is varied depending on the kind of the condensing agent, it is generally 0.01 mol or more, preferably 0.05 to 1.5 mols, per mol of the compound of the formula $R^1COOH$ or the compound of the formula $R^1COX$. More specifically, when a dehydration catalyst such as concentrated sulfuric acid is used as the condensing agent, its amount is generally 0.01 to 0.5 mol, preferably 0.05 to 0.2 mol, per mol of the compound of the formula $R^1COOH$ or the compound of the formula $R^1COX$. When a dehydrating agent such as N,N'-dicyclohexylcarbodiimide is used as the condensing agent, its amount is generally 1 mol or more, preferably 1 to 1.5 mols, per mol of the compound of the formula $R^1COOH$ or the compound of the formula $R^1COX$.

As a solvent for the reaction, any solvent may be used so long as it has no undesirable influence on the reaction. The solvent includes, for example, aromatic hydrocarbons such as benzene, toluene, and xylene; halogenated hydrocarbons such as methyl chloride, dichloromethane, chloroform, carbon tetrachloride, trichloroethylene, and tetrachloroethylene; and ethers such as dimethyl ether, diethyl ether, and diisopropyl ether. Of these, solvents capable of undergoing azeotropy with water, such as toluene and benzene are preferable. The solvents exemplified above may be used singly or in combination.

The reaction temperature is generally 70° C. to 150° C., preferably 80° C. to 120° C.

The reaction time is generally 30 minutes to 10 hours, preferably 1 to 8 hours.

Other operations for the reaction, after-treatment, etc. may be carried out in the same manner as in the case of a well-known similar reaction.

The compound of the formula [5] of the present invention can easily be synthesized according to the above-mentioned process for synthesizing the compound of the formula [1], except for using, for example, a compound of the formula $R^8COOH$ ($R^8$ is as defined above) or a compound of the formula $R^8COX$ ($R^8$ and X are as defined above) in place of the compound of the formula $R^1COOH$ or the compound of the formula $R^1COX$, respectively, and using a compound of the formula

Rf—$R^9OH$ (wherein Rf and $R^9$ are as defined above) in place of the compound of the formula $R^2OH$.

The compound of the formula [2], wherein $R^4$ and $R^5$ are independently an aliphatic hydrocarbon residue, can be obtained, for example, by esterifying a compound of the formula [7]:

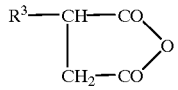

wherein $R^3$ is as defined above, or a compound of the formula [8]:

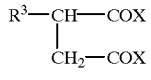

wherein $R^3$ and X are as defined above, with a compound of the formula $R^4OH$ and a compound of the formula $R^5OH$ by a dehydrating or dehydrohalogenating condensation using a condensing agent.

The total amount of the compounds of the formulae $R^4OH$ and $R^5OH$ used is generally equivalent, or a little more relative to the compound of the formula [7] or [8].

As the condensing agent, any conventional ones may be used. There can be exemplified inorganic dehydrating agents (e.g. concentrated sulfuric acid, diphosphorus pentaoxide, anhydrous zinc chloride, etc.), carbodiimides (e.g. N,N'-dicyclohexylcarbodiimide, 1-ethyl-3-(3-dimethylaminopropylcarbodiimide)hydrochloride, etc.), polyphosphoric acid, acetic anhydride, carbonyldiimidazole, p-toluenesulfonyl chloride, etc.

Although the amount of the condensing agent used is varied depending on the kind of the condensing agent, it is generally 0.01 mol or more, preferably 0.05 to 3 mols, per mol of the compound of the formula [7] or [8]. More specifically, when a dehydration catalyst such as concentrated sulfuric acid is used as the condensing agent, its amount is generally 0.01 to 0.5 mol, preferably 0.05 to 0.2 mol, per mol of the compound of the formula [7] or [8]. When a dehydrating agent such as N,N'-dicyclohexylcarbodiimide is used as the condensing agent, its amount is generally 1 mol or more, preferably 1 to 3 mols, per mol of the compound of the formula [7] or [8].

As a solvent for the reaction, any solvent may be used so long as it has no undesirable influence on the reaction. The solvent includes, for example, aromatic hydrocarbons such as benzene, toluene, and xylene; halogenated hydrocarbons such as methyl chloride, dichloromethane, chloroform, carbon tetrachloride, trichloroethylene, and tetrachloroethylene; and ethers such as dimethyl ether, diethyl ether, and diisopropyl ether. Of these, solvents capable of undergoing azeotropy with water, such as toluene and benzene are preferable. The solvents exemplified above may be used singly or in combination.

The reaction temperature is generally 70° C. to 150° C., preferably 80° C. to 120° C.

The reaction time is generally 30 minutes to 10 hours, preferably 2 to 8 hours.

The compound of the formula [2] wherein $R^4$ or $R^5$ is a hydrogen atom can be obtained, for example, by esterifying a compound of the formula:

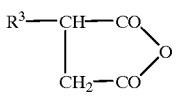

[7]

wherein $R^3$ is as defined above, with a compound of the formula: $R^4OH$ or a compound of the formula: $R^5OH$ by a dehydrating or dehydrohalogenating condensation.

The amount of the compound of the formula: $R^4OH$ or $R^5OH$ is substantially equimolar relative to the compound of the formula [7].

As a solvent for the reaction, any solvents may be used so long as they have no undesirable influence on the reaction. The same solvents as used for synthesizing the diester type compound of the formula [2] can be used.

The reaction temperature is generally 70° C. to 150° C. preferably 80° C. to 120° C.

The reaction time is generally 30 minutes to 30 hours, preferably 2 to 25 hours.

Other operations for the reaction, after-treatment, etc. may be carried out in the same manner as in the case of a well-known similar reaction.

The lubricant composition of the present invention contains the compound of the formula [1] and the compound of the formula [2] in a weight ratio in the range of generally 5/95 to 80/20, preferably 20/80 to 65/35.

When a layer containing the lubricant composition of the present invention is formed on the surface of a magnetic recording medium, the lubricant composition of the present invention is used in the form of a solution in a suitable solvent.

As the solvent used for this purpose, organic solvents capable of dissolving the lubricant composition of the present invention can be exemplified. Specific examples of the solvent are ketones such as acetone, ethyl methyl ketone, isobutyl methyl ketone, t-butyl methyl ketone, and cyclohexanone; hydrocarbons such as hexane, heptane, octane, and cyclohexane; aromatic hydrocarbons such as benzene, toluene, and xylene; and alcohols such as methanol, ethanol, n-propanol, isopropanol, n-butanol, isobutanol and t-butanol. Of these, solvents having a hydroxyl group or a carbonyl group are preferable. The solvents exemplified above may be used singly or in combination.

The lubricant composition of the present invention comprises the compounds of the formulae [1] and [2]. A preferable combination of these compounds is such that the melting point of the compound of the formula [1] is lower than that of the compound of the formula [2]. The lubricant composition of the present invention comprising such a preferable combination of the compounds is hardly crystallized even when stored under various conditions or exposed to a remarkable circumstantial change, and further it has very excellent weather resistance and lubricating effect.

The difference between the melting points of the compounds of the formulae [1] and [2] is generally 80° C. or less, preferably 3° C. to 50° C., more preferably about 5° C. to about 30° C.

The magnetic recording medium of the present invention preferably comprises a non-magnetic substrate, a magnetic recording layer, a protecting layer and a layer comprising the lubricant composition of the present invention, these layers being formed in this order.

The magnetic recording medium can take a tape shape, a disc or disk shape.

The non-magnetic substrate which constitutes the magnetic recording medium includes, for example, substrates composed of a polymer film of poly(ethylene terephthalate), poly(ethylene naphthalate), polyimide, polyamide, poly (vinyl chloride), polycarbonate, poly(ethyl ether ketone), polysulfone or the like, glass substrates, aluminum substrates, etc. The non-magnetic substrate is preferably flexible.

Although the thickness of the substrate is somewhat varied depending on the manner of use of the magnetic recording medium, it is generally 3 $\mu$m to 5 mm, preferably 3 to 100 $\mu$m. When the substrate takes a tape shape, its thickness is more preferably 3 to 10 $\mu$m. When the substrate takes a disc shape, its thickness is more preferably 30 to 75 $\mu$m.

As the magnetic recording layer, there can be exemplified thin metal layers of cobalt, nickel, chromium, iron, or an alloy thereof, and thin metal layers composed mainly of the above-exemplified metal.

The thickness of the magnetic recording layer is generally 50 to 300 nm, preferably 100 to 200 nm.

As the protecting layer, there can be exemplified protecting layers comprising a carbon-containing layer formed by plasma polymerization, preferably layers formed by plasma polymerization using one of or a proper mixture of hydrocarbon gases such as methane, ethane, ethylene, propane, propylene, acetylene, butane, and benzene as a starting material.

As a method for forming the magnetic recording layer on the non-magnetic substrate, there can be exemplified conventional methods such as vacuum film-forming method, e.g. vacuum deposition, sputtering, ion plating, etc.

As a method for forming the protecting layer on the magnetic recording layer, there can be exemplified conventional methods such as a method in which the protecting layer is formed on the magnetic recording layer by plasma discharge of a starting gas or a combination of a starting gas and argon gas under reduced pressure by use of an electric source for DC, AC, a high-frequency current of 10 kHz to 20 MHz, or the like.

As a method for forming the layer comprising the lubricant composition on the protecting layer, there can be exemplified conventional methods such as knife coating, bar coating, kiss-roller coating, dip coating, reverse-roll coating, die nozzle coating, extrusion nozzle coating, gravure coating, spin coating, and offset gravure coating. When the magnetic recording medium has a tape shape, reverse-roll coating, extrusion nozzle coating, etc. are preferable. When the magnetic recording medium has a disc shape, spin coating, dip coating, etc. are preferable.

The amount of the lubricant composition used is generally 0.1 to 30 mg/m$^2$, preferably 1 to 10 mg/m$^2$, relative to the area of the protecting layer surface. When the amount is less than 0.1 mg/m$^2$, the lubricating effect and the still life are not sufficient in some cases. When the amount is more than 30 mg/m$^2$, stick slip takes place to cause a trouble in running in some cases.

The thickness of the layer comprising the lubricant composition is generally a thickness corresponding to one molecule or a pile of several molecules of the compounds contained in the lubricant composition.

The tape shaped magnetic recording medium may have a back coating layer on the non-magnetic substrate surface opposite to the magnetic recording layer.

The back coating layer can be formed by applying a coating material prepared by dispersing 100 parts by weight of a binder resin and 30 to 400 parts by weight of particles of an inorganic compound and/or carbon black in a suitable organic solvent. The back coating layer may contain conventional organic additives.

The binder resin includes, for example, high-molecular weight compounds such as vinyl chloride type copolymers, polyurethane resins, acrylic resins, epoxy resins, phenoxy resins, and polyester resins. These may be used singly or in combination, depending on characteristics of the magnetic recording medium to be produced, and its production conditions.

The inorganic compound includes, for example, calcium carbonate, alumina, α-iron oxide, etc. The particle size of the inorganic compound may be chosen depending on electric resistance, frictional properties, etc., which are required of the magnetic recording medium.

The organic solvent includes, for example, ketones such as acetone, ethyl methyl ketone, 2-hexanone, acetophenone, cyclohexanone, and benzophenone; and aromatic hydrocarbons such as benzene, toluene, o-xylene, p-xylene, m-xylene, naphthalene, cumene, and t-butylbenzene. Any organic solvent may be used so long as it properly dissolves the binder resin.

The organic additives other than the lubricant composition of the present invention include fatty acids, fatty acid esters, dispersants, surfactants, etc., which are generally used in the art.

The amount of the organic additives used is about 0.1 to about 5 parts by weight per 100 parts by weight of particles of the inorganic compound and/or carbon black.

When the magnetic recording medium has a tape shape, the layer containing the lubricant composition may be formed on the protecting layer, for example, by incorporating the lubricant composition of the present invention into the back coating layer previously and transfer some of the lubricant composition to the magnetic recording layer side.

The present invention is explained below in further detail with reference to Examples, and the present invention is not limited thereto by any means.

EXAMPLE 1

Synthesis of perfluorooctylethyl myristate

With 500 g of myristic acid were mixed 1,100 g of perfluorooctylethanol and 2,300 ml of toluene, and 20 g of concentrated sulfuric acid was slowly added with stirring. The resulting mixture was vigorously refluxed for about 2 hours and 30 minutes to carry out the reaction until water was removed azeotropically. After completion of the reaction, the reaction mixture was cooled and then treated with decoloring carbon. Acetonitrile was added with stirring and the resulting mixture was ice-cooled to 5° C. to 10° C., followed by crystallization for 1 hour. The crystals precipitated were subjected to washing filtration with acetonitrile and then dried to obtain 1,120 g (yield: 75%) of perfluorooctylethyl myristate.

This compound was confirmed to be the desired compound from its analysis results obtained by infrared absorption spectrum, $^1$H-NMR and gas chromatography. The melting point of said compound was 46.0° C.

$^1$H-NMR (270 MHz, CDCl$_3$) δ ppm: 0.85–0.90(t, 3H, —C$\underline{H}_3$), 1.26(s, 20H, —(C$\underline{H}_2$)$_{10}$—CH$_3$), 1.58–1.65(t, 2H, —C$\underline{H}_2$—(CH$_2$)$_{10}$—), 2.29–2.35(t, 2H, —C$\underline{H}_2$—COO—), 2.47(t, 2H, —C$\underline{H}_2$—CF$_2$—), 4.35–4.40(t, 2$\underline{H}$, —COO—C$\underline{H}_2$—).

IR (KBr disk) δ cm$^{-1}$:
1747(C=O, ester), 1204, 1150(C—F, fluoride).

REFERENCE EXAMPLE 1

Synthesis of perfluorooctylethyl palmitate

125 Grams (yield: 89%) of perfluorooctylethyl palmitate was obtained in the same manner as in Example 1 except for using 51 g of palmitic acid, 102 g of perfluorooctylethanol, 280 ml of toluene and 1 g of p-toluenesulfonic acid.

The obtained compound was confirmed to be the desired compound from its analysis results obtained by infrared absorption spectrum, $^1$H-NMR and gas chromatography. The melting point of said compound was 50.6° C.

$^1$H-NMR (270 MHz, CDCl$_3$) δ ppm: 0.85–0.90(t, 3H, —C$\underline{H}_3$), 1.26(s, 24H, —(C$\underline{H}_2$)$_{12}$—CH$_3$), 1.58–1.65(t, 2H, —C$\underline{H}_2$—(CH$_2$)$_{12}$—), 2.29–2.35(t, 2H, —C$\underline{H}_2$—COO—), 2.47(t, 2H, —C$\underline{H}_2$—CF$_2$—), 4.35–4.40(t, 2$\underline{H}$, —COO—C$\underline{H}_2$—).

IR (KBr disk) δ cm$^{-1}$:
1747(C=O, ester), 1204, 1150(C—F, fluoride).

REFERENCE EXAMPLE 2

Synthesis of perfluorooctylethyl stearate

132 Grams (yield: 91%) of perfluorooctylethyl stearate was obtained in the same manner as in Example 1 except for using 57 g of stearic acid, 98 g of perfluorooctylethanol, 290 ml of toluene and 1 g of p-toluenesulfonic acid.

The obtained compound was confirmed to be the desired compound from its analysis results obtained by infrared absorption spectrum, $^1$H-NMR and gas chromatography. The melting point of said compound was 56.8° C.

$^1$H-NMR (270 MHz, CDCl$_3$) δ ppm: 0.85–0.90(t, 3H, —C$\underline{H}_3$), 1.26(s, 28H, —(C$\underline{H}_2$)$_{14}$—CH$_3$), 1.58–1.65(t, 2H, —C$\underline{H}_2$—(CH$_2$)$_{12}$—), 2.29–2.35(t, 2H, —C$\underline{H}_2$—COO—), 2.47(t, 2H, —C$\underline{H}_2$—CF$_2$—), 4.35–4.40(t, 2$\underline{H}$, —COO—C$\underline{H}_2$—).

IR (KBr disk) δ cm$^{-1}$:
1747(C=O, ester), 1204, 1150(C—F, fluoride).

REFERENCE EXAMPLE 3

Synthesis of perfluorooctylethyl oleate

With 57 g of oleic acid were mixed 93 g of perfluorooctylethanol and 340 ml of toluene, and 3 g of p-toluenesulfonic acid was slowly added with stirring. The resulting mixture was vigorously refluxed for about 1 hour and 30 minutes to carry out the reaction until water was removed azeotropically. After completion of the reaction, the reaction mixture was cooled and then concentrated under reduced pressure to remove the toluene, and the residue was dissolved in 300 ml of n-hexane. The resulting solution was purified by a column chromatography to obtain 129 g (yield: 88%) of perfluorooctylethyl oleate.

This compound was confirmed to be the desired compound from its analysis results obtained by infrared absorption spectrum and gas chromatography.

IR (KBr disk) δ cm$^{-1}$:
1747(C=O, ester), 1204, 1150(C—F, fluoride).

REFERENCE EXAMPLE 4

Synthesis of perfluorooctylethyl linoleate

128 Grams (yield: 88%) of perfluorooctylethyl linoleate was obtained in the same manner as in Reference Example 3 except for using 56 g of linoleic acid, 93 g of perfluorooctylethanol, 340 ml of toluene and 3 g of p-toluenesulfonic acid.

The obtained compound was confirmed to be the desired compound from its analysis results obtained by infrared absorption spectrum and gas chromatography.

IR (KBr disk) δ cm$^{-1}$:
1746(C=O, ester), 1204, 1150(C—F, fluoride).

REFERENCE EXAMPLE 5

Synthesis of diperfluorooctylethyl tetradecanylsuccinate

520 Grams (yield: 85%) of diperfluorooctylethyl tetradecanylsuccinate was obtained in the same manner as in Example 1 except for using 150 g of n-tetradecanylsuccinic anhydride, 510 g of perfluorooctylethanol, 1,000 ml of toluene and 5 ml of concentrated sulfuric acid.

The obtained compound was confirmed to be the desired compound from its analysis results obtained by infrared absorption spectrum, $^1$H-NMR and gas chromatography. The melting point of said compound was 47.9° C.

$^1$H-NMR (270 MHz, CDCl$_3$) δ ppm: 0.88(t, 3H, —CH$_3$), 1.25(s, 24H, —(CH$_2$)$_{12}$—CH$_3$), 1.40–1.75(m, 2H, —CH$_2$—(CH$_2$)$_{12}$—CH$_3$), 2.35–2.55(m, 5H, CH, —CH$_2$—CF$_2$—×2), 2.65–2.85(t, 2H, —CH$_2$—COO—), 4.38–4.40(q, 4H, —COO—CH$_2$—×2).

IR (KBr disk) δ cm$^{-1}$:
1744(C=O, ester), 1220, 1147(C—F, fluoride).

REFERENCE EXAMPLE 6

Synthesis of monoperfluorooctylethyl octadecylsuccinate

With 460 g of octadecylsuccinic anhydride were mixed 610 g of perfluorooctylethanol and 3,000 ml of toluene, and the reaction was carried out for 24 hours by heating the mixture under reflux while removing the water produced as a by-product. After completion of the reaction, the reaction mixture was concentrated under reduced pressure to remove the toluene, and the residue was dissolved in 3,000 ml of methanol with heating, followed by cooling and crystallization. The solution was stirred at 7° C. to 10° C. for 1 hour, after which the crystals were collected by filtration, washed with methanol and then dried to obtain 970 g (yield: 91%) of monoperfluorooctylethyl octadecylsuccinate.

This compound was confirmed to be the desired compound from its analysis results obtained by infrared absorption spectrum, $^1$H-NMR and gas chromatography. The melting point of said compound was 58.0° C.

$^1$H-NMR (270 MHz, CDCl$_3$) δ ppm: 0.88(t, 3H, —CH$_3$), 1.25(s, 32H, —CH$_2$—(CH$_2$)$_{16}$—CH$_3$), 1.40–1.75(m, 2H, —CH$_2$—(CH$_2$)$_{16}$—CH$_3$), 2.35–2.55(m, 3H, CH, —CH$_2$—CF$_2$—), 2.65–2.85(t, 2H, —CH$_2$—COO—), 4.38–4.40 (q, 2H, —COO—CH$_2$—).

IR (KBr disk) δ cm$^{-1}$:
1738(C=O, ester), 1203, 1150(C—F, fluoride).

REFERENCE EXAMPLE 7

Synthesis of diperfluorooctylethyl octadecylsuccinate

With 50 g of octadecylsuccinic anhydride were mixed 135 g of perfluorooctylethanol and 280 ml of toluene, and 5 g of concentrated sulfuric acid was added. Then, the reaction was carried out for 6 hours by heating the mixture under reflux while removing the water produced as a by-product. After completion of the reaction, the reaction mixture was cooled to 5° C. to 8° C., and the crystals precipitated were collected by filtration. Subsequently, the wet crystals were dissolved as they were in 300 ml of acetone with heating and treated with decoloring carbon, followed by cooling and crystallization. The solution was stirred at 10° C. to 15° C. for 2 hours, after which the crystals thus precipitated were collected by filtration, washed with acetone and then dried to obtain 143 g (yield: 80%) of diperfluorooctylethyl octadecylsuccinate as white crystalline powder. This compound was confirmed to be the desired compound by $^1$H-NMR and gas chromatography analyses. The melting point of said compound was 59.1° C. to 60.9° C.

$^1$H-NMR (270 MHz, CDCl$_3$) δ ppm: 0.88(t, 3H, —CH$_3$), 1.25(s, 32H, —CH$_2$—(CH$_2$)$_{16}$—CH$_3$), 1.40–1.75(m, 2H, —CH$_2$—(CH$_2$)$_{16}$—CH$_3$), 2.35–2.55(m, 5H, CH, —CH$_2$—CF$_2$—×2), 2.65–2.85(t, 2H, —CH$_2$—COO—), 4.38–4.40(q, 4H, —COO—CH$_2$—×2).

REFERENCE EXAMPLE 8

Synthesis of diperfluorooctylethyl octadecenylsuccinate

51 Grams (yield: 81%) of diperfluorooctylethyl octadecenylsuccinate was obtained in the same manner as in Example 1 except for using 18 g of octadecenylsuccinic anhydride, 46 g of perfluorooctylethanol, 110 ml of toluene and 1 ml of concentrated sulfuric acid.

The obtained compound was confirmed to be the desired compound from its analysis results obtained by infrared absorption spectrum, $^1$H-NMR and gas chromatography. The melting point of said compound was 40.5° C.

$^1$H-NMR (270 MHz, CDCl$_3$) δ ppm: 0.88(t, 3H, —CH$_3$), 1.25(s, 28H, —CH$_2$—(CH$_2$)$_{14}$—CH$_3$), 1.95–2.00(m, 2H, —CH$_2$—(CH$_2$)$_{14}$—CH$_3$), 2.35–2.55(m, 5H, CH, —CH$_2$—CF$_2$—×2), 2.65–2.85(t, 2H, —CH$_2$—COO—), 4.38–4.40(q, 4H, —COO—CH$_2$—×2).

IR (KBr disk) δ cm$^{-1}$:
1747(C=O, ester), 1204, 1150(C—F, fluoride).

EXAMPLE 2

Lubricant Compositions of the Present Invention

Lubricant compositions of the present invention were obtained by mixing a compound of the formula [1] and a compound of the formula [2] in the ratio shown in Table 1.

EXAMPLES 3 to 30

Production of Digital Video Camera (DVC) Tapes, Magnetic Recording Media Using the Lubricant Composition of the Present Invention A poly(ethylene terephthalate) film of 6.5 μm thick was used as a non-magnetic substrate. A cobalt deposition type magnetic recording layer of 200 nm thick and then a protecting layer of 10 nm thick composed of a plasma polymerization film of ethylene were formed on the non-magnetic substrate by a conventional method. A layer comprising the predetermined amounts (mg/m$^2$) of the predetermined lubricants according to the present invention shown in Table 1 was formed on the protecting layer by a conventional method. After the formation of the protecting layer, a back coat layer composed of carbon black, a phenoxy resin and a polyurethane resin in the ratio of 50/25/25 was formed by coating on the non-magnetic substrate surface reverse to the magnetic recording layer. The resulting multi-layer material was cut to a width of 6.35 mm to produce a DVC tape using the lubricant composition of the present invention.

COMPARATIVE EXAMPLES 1 to 29

DVC tapes were produced in the same manner as in Example 3 except for forming a layer comprising the predetermined amount (mg/m$^2$) of the predetermined lubricant shown in Table 2, in place of the layer comprising the lubricant composition of the present invention. The structural formulae of the lubricants used in Examples 2 to 30 and Comparative Examples 1 to 29 are as follows:

Group A

A-1 $C_{13}H_{27}COOCH_2CH_2C_8F_{17}$
A-2 $C_{13}H_{27}COOC_4H_9$
A-3 $C_{15}H_{31}COOCH_2CH_2C_8F_{17}$
A-4 $C_{17}H_{35}COOCH_2CH_2C_8F_{17}$
A-5 $C_{17}H_{33}COOCH_2CH_2C_8F_{17}$
A-6 $C_{13}H_{27}COOCH_2CH_2OCH_2CH_2OC_9F_{17}$
A-7 $C_{15}H_{31}COOC_4H_9$
A-8 $C_{17}H_{35}COOC_4H_9$
A-9 $C_{17}H_{33}COOC_4H_9$
A-10 $C_{17}H_{31}COOCH_2CH_2C_8F_{17}$

Group B

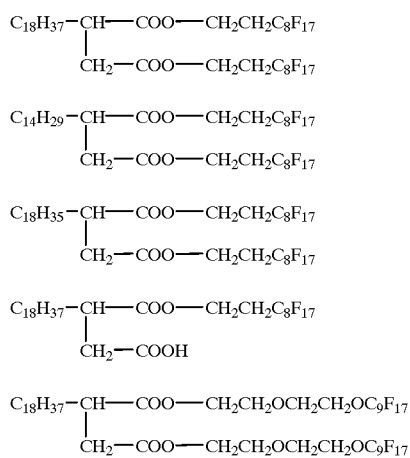

B-1

B-2

B-3

B-4

B-5

EXPERIMENT 1

Investigation on Characteristics of the DVC Tapes

The coefficient of friction and still life of the DVC tapes obtained in Examples 3 to 30 and Comparative Examples 1 to 29 were measured by the following methods. The precipitation of crystals on the lubricant layer of each DVC tape was observed by the method described below.

Measurement of the Coefficient of Friction

Each DVC tape was wound at an angle of 90 degrees around a SUS303 pin of 2 mmφ (in diameter) and 0.2S, and a load of 0.1 N was applied thereto, followed by 100 passes at 18.8 mm/S. The tension was measured by means of a tension pickup, and the coefficient of friction in each pass was calculated according to Euler's equation. The maximum measured value is shown in the "coefficient of friction" column in Table 1.

Criterion for Judgement

In general, the magnetic recording medium is eligible for practical purposes when its efficient of friction is 0.32 or less. It is especially excellent as a DVC tape when its efficient of friction is 0.25 or less.

Measurement of the Still Life

Using each DVC tape, recording was carried out at 0° C. or 20° C. for 10 minutes with an altered DVC, followed by playback. From 5 minutes after the start of the playback, the DVC tape was kept still and the image and the output were checked. The still life was defined as a time required for abnormality to occur in the image or the output.

Criterion for Judgement

The still life is preferably as long as possible. For practical purposes, it is preferably 30 minutes or more.

Observation of Crystals Precipitation on the Lubricant Layer

Each DVC tape was stored for 3 weeks at 30° C. and a humidity of 90% and the precipitation of crystals on the lubricant layer surface was observed under an optical microscope of 100 magnification.

Criterion for Judgement

○: No crystals were particularly observed (excellent weather resistance).

Δ: Granular crystals were observed in places but were negligible in practice (good weather resistance).

×: Granular or needle crystals were observed all over the lubricant layer surface and were obstructive in practice (poor weather resistance).

Results

Table 1 shows the results for the DVC tapes obtained in Examples 3 to 30.

TABLE 1

| Example | Group A (Coating amount mg/m$^2$) | Group B (Coating amount mg/m$^2$) | Coefficient of friction (running durability) | Still life (min) 0° C. | Still life (min) 20° C. | Precipitation of lubricant (weather resistance) |
|---|---|---|---|---|---|---|
| 3 | A-1 (4.0) | B-1 (1.0) | 0.29 | >60 | >60 | ○ |
| 4 | A-1 (3.0) | B-1 (2.0) | 0.28 | >60 | >60 | ○ |
| 5 | A-1 (2.5) | B-1 (2.5) | 0.25 | >60 | >60 | ○ |
| 6 | A-1 (2.0) | B-1 (3.0) | 0.23 | 45 | >60 | ○ |
| 7 | A-1 (1.0) | B-1 (4.0) | 0.21 | 35 | >60 | Δ |
| 8 | A-1 (2.0) | B-1 (2.0) | 0.24 | 35 | >60 | ○ |
| 9 | A-1 (3.0) | B-1 (3.0) | 0.28 | 55 | >60 | ○ |

TABLE 1-continued

| Example | Group A (Coating amount mg/m$^2$) | Group B (Coating amount mg/m$^2$) | Coefficient of friction (running durability) | Still life (min) 0° C. | Still life (min) 20° C. | Precipitation of lubricant (weather resistance) |
|---|---|---|---|---|---|---|
| 10 | A-2 (4.0) | B-1 (1.0) | 0.29 | >60 | >60 | ○ |
| 11 | A-2 (3.0) | B-1 (2.0) | 0.29 | >60 | >60 | ○ |
| 12 | A-2 (2.5) | B-1 (2.5) | 0.26 | >60 | >60 | ○ |
| 13 | A-2 (2.0) | B-1 (3.0) | 0.25 | 55 | >60 | ○ |
| 14 | A-2 (1.0) | B-1 (4.0) | 0.22 | 30 | >60 | Δ |
| 15 | A-2 (2.0) | B-1 (2.0) | 0.24 | 45 | >60 | ○ |
| 16 | A-2 (3.0) | B-1 (3.0) | 0.28 | 55 | >60 | ○ |
| 17 | A-1 (2.5) | B-2 (2.5) | 0.27 | 60 | >60 | ○ |
| 18 | A-1 (2.5) | B-3 (2.5) | 0.24 | 40 | >60 | ○ |
| 19 | A-1 (2.5) | B-4 (2.5) | 0.27 | 45 | >60 | ○ |
| 20 | A-1 (2.5) | B-5 (2.5) | 0.27 | 35 | >60 | ○ |
| 21 | A-3 (2.5) | B-1 (2.5) | 0.26 | 60 | >60 | ○ |
| 22 | A-4 (2.5) | B-1 (2.5) | 0.25 | 55 | >60 | ○ |
| 23 | A-5 (2.5) | B-1 (2.5) | 0.28 | >60 | >60 | ○ |
| 24 | A-6 (2.5) | B-1 (2.5) | 0.27 | 45 | >60 | ○ |
| 25 | A-7 (2.5) | B-1 (2.5) | 0.28 | >60 | >60 | ○ |
| 26 | A-9 (2.5) | B-1 (2.5) | 0.27 | 60 | >60 | ○ |
| 27 | A-9 (2.5) | B-1 (2.5) | 0.30 | >60 | >60 | ○ |
| 29 | A-1 (2.0) | B-1,B-2 (1.5)(1.5) | 0.25 | 55 | >60 | ○ |
| 29 | A-1 (3.0) | B-1,B-2 (1.0)(1.0) | 0.25 | 40 | >60 | ○ |
| 30 | A-10 (2.5) | B-1 (2.5) | 0.29 | >60 | >60 | ○ |

Table 2 shows the results for the DVC tapes obtained in Comparative Examples 1 to 29.

TABLE 2

| Comparative Example | Group A (Coating amount mg/m$^2$) | Group B (Coating amount mg/m$^2$) | Coefficient of friction (running durability) | Still life (min) 0° C. | Still life (min) 20° C. | Precipitation of lubricant (weather resistance) |
|---|---|---|---|---|---|---|
| 1 | None | B-1 (3.0) | 0.22 | 10 | >60 | Δ |
| 2 | None | B-1 (4.0) | 0.22 | 20 | >60 | x |
| 3 | None | B-1 (5.0) | 0.23 | 20 | >60 | x |
| 4 | None | B-1 (6.0) | 0.23 | 25 | >60 | x |
| 5 | None | B-2 (3.0) | 0.22 | 10 | >60 | Δ |
| 6 | None | B-2 (4.0) | 0.23 | 25 | >60 | Δ |
| 7 | None | B-2 (5.0) | 0.25 | 25 | >60 | x |
| 8 | None | B-2 | 0.28 | 25 | >60 | x |

TABLE 2-continued

| Comparative Example | Group A (Coating amount mg/m²) | Group B (Coating amount mg/m²) | Coefficient of friction (running durability) | Still life (min) 0° C. | Still life (min) 20° C. | Precipitation of lubricant (weather resistance) |
|---|---|---|---|---|---|---|
| 9 | None | B-3 (6.0) | 0.22 | 10 | >60 | Δ |
| 10 | None | B-3 (3.0) | 0.23 | 25 | >60 | Δ |
| 11 | None | B-3 (4.0) | 0.25 | 25 | >60 | x |
| 12 | None | B-3 (5.0) | 0.29 | 25 | >60 | x |
| 13 | None | B-4 (6.0) | 0.22 | 20 | >60 | Δ |
| 14 | None | B-5 (5.0) | 0.26 | 20 | >60 | Δ |
| 15 | A-1 (5.0) | None | 0.31 | 10 | >60 | ○ |
| 16 | A-1 (3.0) | None | 0.33 | 55 | >60 | ○ |
| 17 | A-1 (4.0) | None | 0.34 | >60 | >60 | ○ |
| 18 | A-1 (5.0) | None | 0.36 | >60 | >60 | ○ |
| 19 | A-2 (6.0) | None | 0.33 | 25 | >60 | ○ |
| 20 | A-2 (3.0) | None | 0.35 | >60 | >60 | ○ |
| 21 | A-2 (4.0) | None | 0.36 | >60 | >60 | ○ |
| 22 | A-2 (5.0) | None | 0.38 | >60 | >60 | ○ |
| 23 | A-3 (6.0) | None | 0.34 | >60 | >60 | ○ |
| 24 | A-4 (5.0) | None | 0.33 | 55 | >60 | ○ |
| 25 | A-5 (5.0) | None | 0.40 | >60 | >60 | ○ |
| 26 | A-6 (5.0) | None | 0.36 | 45 | >60 | Δ |
| 27 | A-7 (5.0) | None | 0.35 | >60 | >60 | ○ |
| 28 | A-8 (5.0) | None | 0.34 | 55 | >60 | ○ |
| 29 | A-9 (5.0) | None | 0.42 | 50 | >60 | ○ |

As is clear from Tables 1 and 2, unlike the magnetic recording media obtained by using only a compound in group A or group B, the magnetic recording media comprising the lubricant composition of the present invention, i.e., the lubricant composition comprising a compound in group A and a compound in group B are excellent in frictional properties, have a sufficiently long still life and are free from precipitation of crystals caused by some degree of temperature and humidity changes (namely, they are excellent also in weather resistance), irrespective of the combination of the compounds and the ratio between them.

Further, Examples 5 to 7 using A-1 show better running durability than Examples 12 to 14 using A-2. In addition, Example 5 has totally improved properties than Examples 21 to 27 and 30 wherein A-3 to A-10 are used. This means that the compound of the formula [5] is superior to A-2 to A-10 in properties.

The present invention provides a lubricant composition capable of producing a magnetic recording medium excellent in running durability, still life and weather resistance, and a magnetic recording medium using said lubricant composition.

What is claimed is:
1. A lubricant composition comprising
(A) a compound of the formula:

wherein $R^1$ is an aliphatic hydrocarbon residue having 6–24 carbon atoms and which may have one or more fluorine atoms; and $R^2$ is an aliphatic hydrocarbon residue which may have one or more fluorine atoms or oxygen atoms or both, and
(B) a compound of the formula:

wherein $R^3$ is an aliphatic hydrocarbon residue having 6 to 24 carbon atoms and which may have one or more fluorine atoms; and $R^4$ and $R^5$ are independently a hydrogen atom or an aliphatic fluorohydrocarbon residue which may have one or more oxygen atoms and represented by the formula:

$$-R^6-Y \quad (3)$$

wherein $R^6$ is a methylene chain which may have one or more oxygen atoms; and Y is a fluoroalkyl group, provided that at least one of $R^4$ and $R^5$ is an aliphatic fluorohydrocarbon residue which may have one or more oxygen atoms.

2. A lubricant composition according to claim 1, wherein $R^1$ is an aliphatic hydrocarbon residue having 6 to 24 carbon atoms and having no double bonds or having 1 to 4 double bonds therein.

3. A lubricant composition according to claim 1, wherein $R^2$ is an aliphatic hydrocarbon residue having 1 to 26 carbon atoms and having no fluorine and oxygen atoms or having 1 to 53 fluorine atoms therein and/or 1 to 4 oxygen atoms in the aliphatic hydrocarbon residue.

4. A lubricant composition according to claim 1, wherein $R^3$ is an aliphatic hydrocarbon residue having 6 to 24 carbon atoms and having no double bonds or having 1 to 4 double bonds therein.

5. A lubricant composition according to claim 1, wherein $R^4$ and $R^5$ are independently an aliphatic hydrocarbon residue having 1 to 26 carbon atoms and having no fluorine and oxygen atoms or having 1 to 53 fluorine atoms therein and/or 1 to 4 oxygen atoms in the aliphatic hydrocarbon residue.

6. A lubricant composition according to claim 1, wherein $R^2$ is a group of the formula:

$$-R^6-Y \quad (3)$$

wherein $R^6$ is a methylene chain which may have one or more oxygen atoms; and Y is a fluoroalkyl group.

7. A lubricant composition according to claim 1, wherein the compound of the formula (1) has a lower melting point than the compound of the formula (2).

8. A process comprising forming a lubricant layer containing the lubricant composition of claim 1 in a magnetic recording medium.

9. A process according to claim 9, wherein the magnetic recording medium is a thin metal film magnetic recording medium.

10. A magnetic recording medium comprising a non-magnetic substrate, a magnetic recording layer formed on the substrate, a protecting layer formed on the magnetic recording layer, and formed thereon a lubricant layer containing the lubricant composition of claim 1.

11. A lubricant composition according to claim 1, wherein in the formula (1), $R^1$ is an alkyl group having 6 to 24 carbon atoms, an aliphatic hydrocarbon residue having 6 to 24 carbon atoms and 1 to 4 double bonds therein, a fluoroalkyl group having 6 to 24 carbon atoms and 1 to 41 fluorine atoms, or an aliphatic fluorohydrocarbon residue having 6 to 24 carbon atoms and 1 to 41 fluorine atoms with 1 to 4 double bonds therein; $R^2$ is an alkyl group having 1 to 26 carbon atoms, an aliphatic hydrocarbon residue having 1 to 26 carbon atoms and 1 to 4 double bonds therein, an alkyl group having 1 to 26 carbon atoms and 1 to 4 oxygen atoms in the alkyl group, an aliphatic hydrocarbon residue having 1 to 26 carbon atoms and 1 to 4 double bonds therein with 1 to 4 oxygen atoms in the aliphatic hydrocarbon residue, a fluoroalkyl group having 1 to 26 carbon atoms and 1 to 53 fluorine atoms, an aliphatic fluorohydrocarbon residue having 1 to 26 carbon atoms and 1 to 53 fluorine atoms and 1 to 4 double bonds therein, a fluoroalkyl group having 1 to 26 carbon atoms and 1 to 53 fluorine atoms with 1 to 4 oxygen atoms in the fluoroalkyl group, or an aliphatic fluorohydrocarbon residue having 1 to 26 carbon atoms, 1 to 53 fluorine atoms and 1 to 4 double bonds therein with 1 to 4 oxygen atoms in the aliphatic fluorohydrocarbon residue, and in the formula (2), $R^3$ is an alkyl group having 6 to 24 carbon atoms, an aliphatic hydrocarbon residue having 6 to 24 carbon atoms and 1 to 4 double bonds therein, a fluoroalkyl group having 6 to 24 carbon atoms and 1 to 49 fluorine atoms, or an aliphatic fluorohydrocarbon residue having 6 to 24 carbon atoms and 1 to 49 fluorine atoms with 1 to 4 double bonds therein; $R^4$ and $R^5$ are independently an alkyl group having 1 to 26 carbon atoms, an aliphatic hydrocarbon residue having 1 to 26 carbon atoms and 1 to 4 double bonds therein, an alkyl group having 1 to 26 carbon atoms with 1 to 4 oxygen atoms in the alkyl group, an aliphatic hydrocarbon residue having 1 to 26 carbon atoms and 1 to 4 double bonds therein with 1 to 4 oxygen atoms in the aliphatic hydrocarbon residue, a fluoroalkyl group having 1 to 26 carbon atoms and 1 to 53 fluorine atoms, an aliphatic fluorohydrocarbon residue having 1 to 26 carbon atoms, 1 to 53 fluorine atoms and 1 to 4 double bonds therein, a fluoroalkyl group having 1 to 26 carbon atoms and 1 to 53 fluorine atoms with 1 to 4 oxygen atoms in the fluoroalkyl group, or an aliphatic fluorohydrocarbon residue having 1 to 26 carbon atoms, 1 to 53 fluorine atoms and 1 to 4 double bonds with 1 to 4 oxygen atoms in the aliphatic fluorohydrocarbon residue.

12. A lubricant composition according to claim 1, wherein $R^2$ in the formula (1) is a group of the formula:

$$-R^6-Y \quad (3)$$

in which $R^6$ is a methylene chain having 1 to 6 carbon atoms, or a methylene chain having 1 to 6 carbon atoms and 1 to 4 oxygen atoms in the methylene chain; and Y is a fluoroalkyl group having 1 to 20 carbon atoms and 1 to 41 fluorine atoms.

13. A lubricant composition according to claim 1, wherein $R^4$ and $R^5$ in the formula (2) are independently a group of the formula:

$$-R^6-Y \quad (3)$$

in which $R^6$ is a methylene chain having 1 to 6 carbon atoms, or a methylene chain having to 6 carbon atoms and 1 to 4 oxygen atoms in the methylene chain; and Y is a fluoroalkyl group having 1 to 20 carbon atoms and 1 to 41 fluorine atoms.

14. A lubricant composition according to claim 1, wherein the component (A) is a compound represented by the formula:

$$R^8-COO-R^9-Rf \quad (5)$$

wherein $R^8$ is a alkyl group having 13 carbon atoms; $R^9$ is a methylene chain having 2 to 6 carbon atoms; and Rf is a perfluoroalkyl group having 7 to 20 carbon atoms.

15. A magnetic recording medium comprising a non-magnetic substrate, a magnetic recording layer formed on the substrate, a protecting layer formed on the magnetic recording layer, and formed thereon a lubricant layer, wherein the lubricant layer contains the lubricant composition of claim 11.

16. A magnetic recording medium comprising a non-magnetic substrate, a magnetic recording layer formed on the substrate, a protecting layer formed on the magnetic recording layer, and formed thereon a lubricant layer, wherein the lubricant layer contains the lubricant composition of claim 12.

17. A magnetic recording medium comprising a non-magnetic substrate, a magnetic recording layer formed on the substrate, a protecting layer formed on the magnetic recording layer, and formed thereon a lubricant layer, wherein the lubricant layer contains the lubricant composition of claim 13.

18. A lubricant composition according to claim 1, wherein $R^6$ is a methylene chain having no oxygen atom.

19. A lubricant composition according to claim 15, wherein $R^6$ is a methylene chain having 1 to 6 carbon atoms and having no oxygen atoms.

20. A lubricant composition according to claim 1, wherein the compound of the formula (1) is at least one member selected from the group consisting of:

$C_{13}H_{27}COOCH_2CH_2C_8F_{17}$,
$C_{13}H_{27}COOC_4H_9$,
$C_{15}H_{31}COOCH_2CH_2C_8F_{17}$,
$C_{17}H_{35}COOCH_2CH_2C_8F_{17}$,
$C_{17}H_{33}COOCH_2CH_2C_8F_{17}$,
$C_{13}H_{27}COOCH_2CH_2OCH_2CH_2OC_9F_{17}$,
$C_{15}H_{31}COOC_4H_9$,
$C_{17}H_{35}COOC_4H_9$,
$C_{17}H_{33}COOC_4H_9$, and
$C_{17}H_{31}COOCH_2CH_2C_8F_{17}$, and the compound of the formula (2) is at least one member selected from the group consisting of:

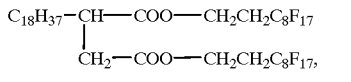
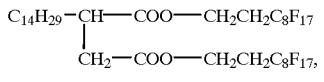
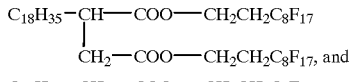
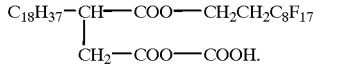

* * * * *

UNITED STATES PATENT AND TRADEMARK OFFICE
CERTIFICATE OF CORRECTION

PATENT NO. : 6,187,724 B1
DATED : February 13, 2001
INVENTOR(S) : Tsunehiko Ikarashi et al.

It is certified that error appears in the above-identified patent and that said Letters Patent is hereby corrected as shown below:

Column 23,
Line 38, "to claim 9," should read -- to claim 8, --.

Column 25,
Line 7, "to claim 15," should read -- to claim 13, --.

Signed and Sealed this

Thirty-first Day of January, 2006

JON W. DUDAS
*Director of the United States Patent and Trademark Office*